US012036163B2

(12) United States Patent
Arenas et al.

(10) Patent No.: US 12,036,163 B2
(45) Date of Patent: Jul. 16, 2024

(54) POSITIVE PRESSURE SUPPORT DEVICE

(71) Applicant: Briizzz LLC, Columbus, OH (US)

(72) Inventors: Marc Antonio Arenas, Ponte Vedra, FL (US); Jeffrey P. Weier, Columbus, OH (US)

(73) Assignee: BRIIZZZ LLC, Columbus, OH (US)

( * ) Notice: Subject to any disclaimer, the term of this patent is extended or adjusted under 35 U.S.C. 154(b) by 103 days.

(21) Appl. No.: 17/746,281

(22) Filed: May 17, 2022

(65) Prior Publication Data

US 2023/0372171 A1 Nov. 23, 2023

(51) Int. Cl.
*A61G 7/057* (2006.01)

(52) U.S. Cl.
CPC ...... *A61G 7/05776* (2013.01); *A61G 2203/32* (2013.01); *A61G 2203/34* (2013.01)

(58) Field of Classification Search
None
See application file for complete search history.

(56) References Cited

U.S. PATENT DOCUMENTS

| | | | | |
|---|---|---|---|---|
| 4,279,044 | A | 7/1981 | Douglas | |
| 4,799,276 | A | 1/1989 | Kadish | |
| 4,801,291 | A | 1/1989 | Loori | |
| 5,001,793 | A * | 3/1991 | Lui | A47C 27/081 5/710 |
| 5,154,697 | A | 10/1992 | Loori | |
| 5,416,935 | A * | 5/1995 | Nieh | A47C 21/044 297/180.13 |
| 5,478,310 | A | 12/1995 | Dyson-Cantwell et al. | |
| 5,533,217 | A * | 7/1996 | Holdredge | A61G 7/05784 5/713 |
| 5,578,022 | A | 11/1996 | Scherson et al. | |
| 5,590,428 | A * | 1/1997 | Roter | A47C 27/081 297/180.13 |
| 5,792,090 | A | 8/1998 | Ladin | |
| 5,865,722 | A | 2/1999 | Heng | |
| 6,553,591 | B1 | 4/2003 | Motosko | |
| 6,575,126 | B2 | 6/2003 | Sturman | |

(Continued)

FOREIGN PATENT DOCUMENTS

| | | |
|---|---|---|
| CN | 107126005 A | 9/2017 |
| DE | 100 56 235 A1 | 5/2002 |

(Continued)

OTHER PUBLICATIONS

Babior, Oxygen-Dependent Microbial Killing By Phagocytes; N. England Journal Med. 1978; 298(12):659-668.

(Continued)

*Primary Examiner* — Adam C Ortiz
(74) *Attorney, Agent, or Firm* — Thompson Hine LLP

(57) ABSTRACT

A support device including a plurality of cells, each cell being at least partially defined by a cell wall, a chamber, and a plurality of valves. Each valve is movable between an open position where the valve provides fluid communication between an associated cell and the chamber, and a closed position wherein the valve generally blocks fluid communication between the associated cell and the chamber. Each valve is configured to be biased to a closed position during use of the device. The device is configured such that when a predetermined force is applied to each cell during use the associated valve moves to the open position.

23 Claims, 9 Drawing Sheets

(56) References Cited

U.S. PATENT DOCUMENTS

| | | | | |
|---|---|---|---|---|
| 6,581,225 B1 * | 6/2003 | Imai | A61G 7/05784 5/652.2 |
| 7,014,630 B2 | 3/2006 | Rosati | |
| 7,278,179 B2 | 10/2007 | Schneider | |
| 7,540,283 B2 | 6/2009 | Loori et al. | |
| 7,922,678 B2 | 4/2011 | Hovorka | |
| 2018/0160821 A1 | 6/2018 | Chapin | |
| 2019/0029439 A1 * | 1/2019 | Wagner | A61G 7/05715 |

FOREIGN PATENT DOCUMENTS

| | | | |
|---|---|---|---|
| WO | WO-2013014948 A1 * | 1/2013 | A61G 7/05738 |
| WO | 2020/178560 A1 | 9/2020 | |

OTHER PUBLICATIONS

Fitzgerald, Cutaneous Respiration in Man; Physiol Rev. 1957; 37(3):325-336.

Fries et al., Dermal excisional wound healing in pigs following treatment with topically applied pure oxygen; Mutat. Res. 2005; 579(1-2):172-181.

Heng et al., Angiogenesis in Necrotic Ulcers Treated with Hyperbaric Oxygen; Sep. 2000; 46(9):18-32.

Hunt, The Physiology of Wound Healing; Annals of Emergency Medicine 1988; 17(12):1265-1273.

Kalliainen et al., Topical oxygen as an adjunct to wound healing: a clinical case series; Pathophysiology 2003; 9(2):81-87.

Knighton et al., Oxygen as an antibiotic. The effect of inspired oxygen on infection; Arch Surg. 1984; 119(2):199-204.

Ladizinsky et al., New Insights Into Oxygen Therapy for Wound Healing; 2010; 22(12):294-300. https://www.hmpgloballearningnetwork.com/site/wounds/article/new-insights-oxygen-therapy-wound healing.

Low et al., Effects of Mattress Material on Body Pressure Profiles in Different Sleeping Postures; Journal of Chiropractic Medicine 2017; pp. 1-9. https://www.ncbl.nlm.nih.gov/pmc/articles/PMC5310954.

Olejniczak, Topical Oxygen Promotes Healing of Leg Ulcers; 1976; 104(12):114-121.

U.S. Receiving Office, International Search Report and Written Opinion dated Aug. 21, 2023 which pertains to PCT Application No. PCT/US2023/022331, filed May 16, 2023. 13 pages.

* cited by examiner

POSITIVE PRESSURE SUPPORT DEVICE

The present invention is directed to a support device, and more particularly to a support device that can apply a positive pressure to a user.

BACKGROUND

Pressure wounds (also known as pressure ulcer or bedsores) are a common affliction for bedridden patients, or persons that otherwise spend extended periods of time in a supine or prone position, or even in a sitting position. The pathophysiology of pressure wounds can vary from patient to patient, but the primary cause of pressure ulcers is tissue hypoxia. In particular, when the patient's skin is pressed between relatively hard surfaces, such as bone and a mattress, the skin vasculature is compressed, which reduces the delivery of oxygen to the compressed area. This hypoxia causes tissue injury, which in turn induces an inflammatory response, and can subsequently induce further hypoxia by increasing the extracellular fluid content of the tissue. The injured area can protrude further outwardly, causing more point pressure, which in turn causes more hypoxia.

The current primary approach to preventing pressure wounds is the implementation of pressure offloading. This entails minimizing pressure points with a specialized mattress or surface, and frequent turning/moving of the patient. However these approaches do not satisfactorily address the formation and/or treatment of pressure wounds.

SUMMARY

The current disclosure is directed to an improved positive pressure system which can reduce the occurrence of pressure wounds. More particularly, in one embodiment the invention is a support device including a plurality of cells, each cell being at least partially defined by a cell wall, a chamber, and a plurality of valves. Each valve is movable between an open position where the valve provides fluid communication between an associated cell and the chamber, and a closed position wherein the valve generally blocks fluid communication between the associated cell and the chamber. Each valve is configured to be biased to a closed position during use of the device. The device is configured such that when a predetermined force is applied to each cell during use the associated valve moves to the open position.

DETAILED DESCRIPTION

Figure 1:
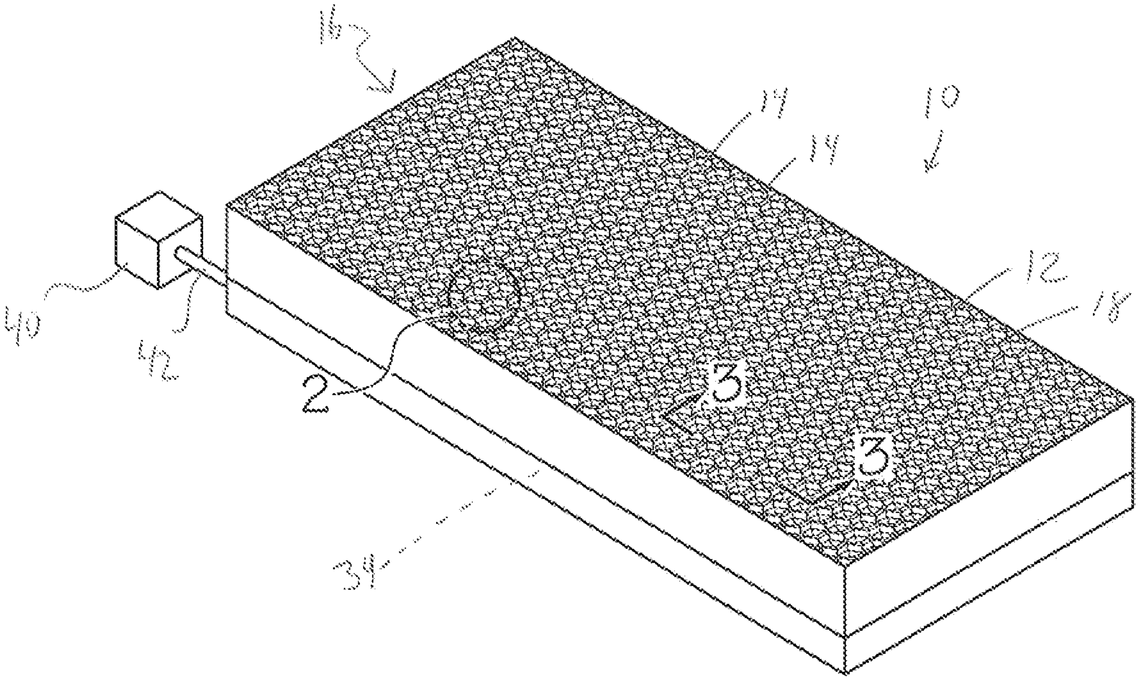
FIG. 1 is a front perspective view of one embodiment of a pressure support device, positioned on or forming a mattress.
Figure 2:
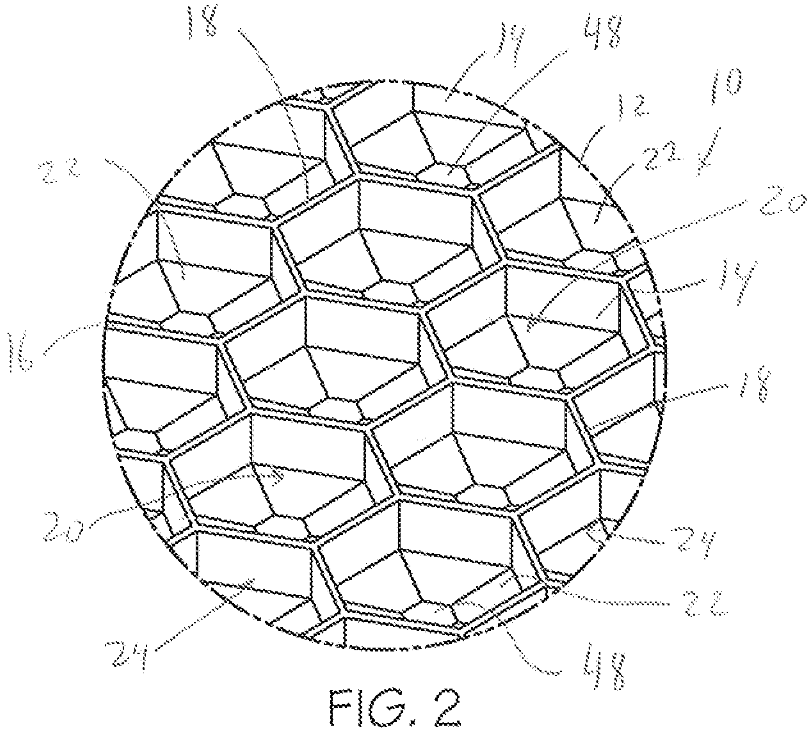
FIG. 2 is a detail view of area "2" indicated in FIG. 1.
Figure 3:
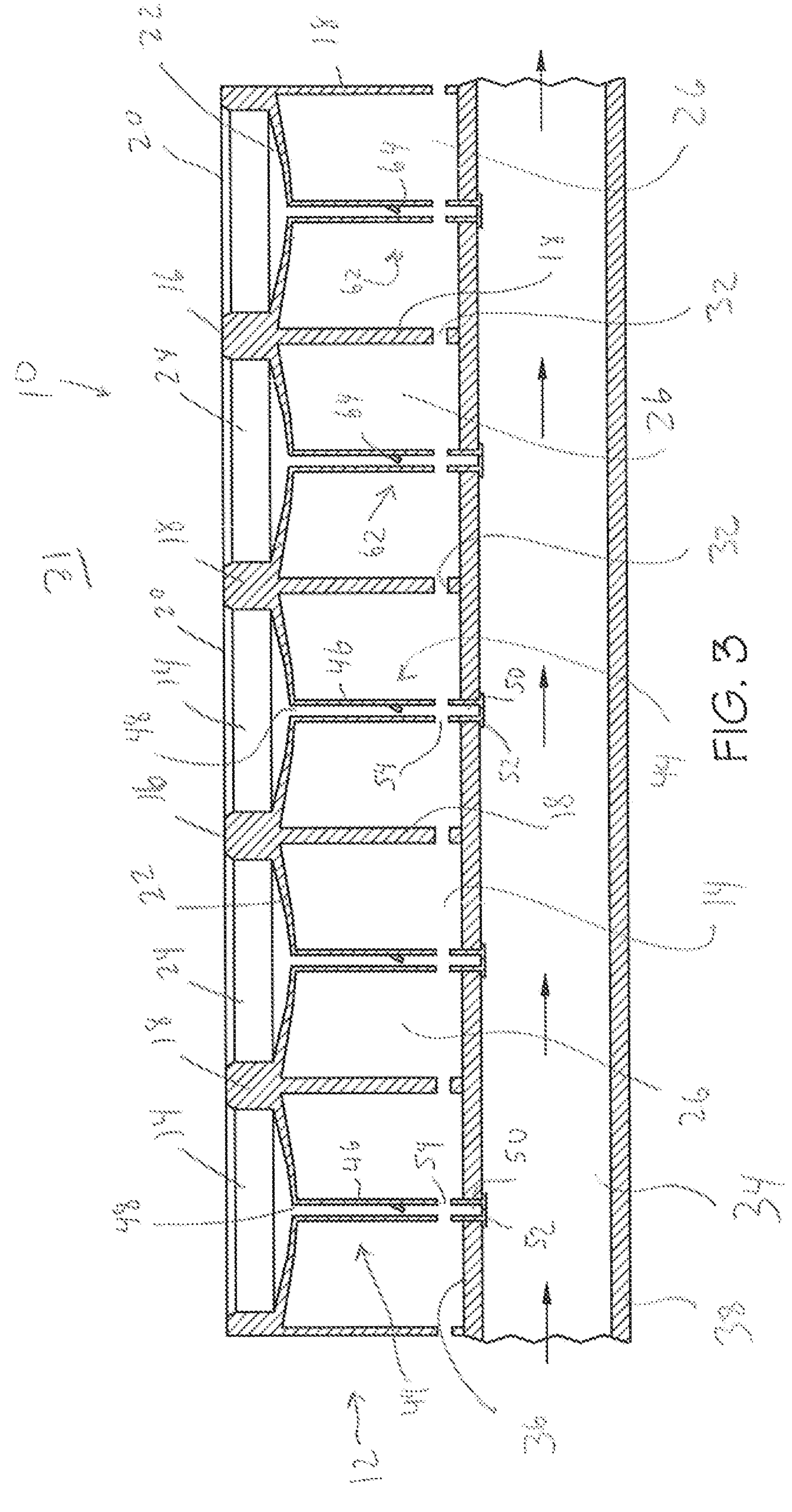
FIG. 3 is a side cross section of the device of FIG. 1, taken along line 3-3 of FIG. 1.

With reference to FIGS. 1-3, in one embodiment the pressure support device or system 10 includes a or takes the form of a mat 12 having a plurality of depressions or cells 14 formed therein and defining an upper (distal), generally planar surface 16 thereof. Each cell 14 can be at least partially defined by or formed of a cell or outer wall 18 that extends around or defines a perimeter of the cell 14. Each cell/outer wall 18 is formed in a hexagonal arrangement in the illustrated embodiment, however it should be understood that each cell/outer wall 18 can have any of a wide variety of other shapes or configurations, including rectangular, square, triangular, pentagonal, circular, oval and other geometric shapes, and/or irregular and/or non-geometric shapes, or combinations thereof.

Each cell 14 can be open ended and have mouth 20 at its upper/distal end, and in the illustrated embodiment has a base wall 22 that divides the cell 14 into an upper or distal cell portion 24 and a lower or base cell portion 26. The mouth 20 of each cell 14 can have a variety of sizes/surface areas, but in one case has a surface area of between about 0.25 square inches and about 9 square inches (or greater than about 0.25 square inches and/less than about 9 square inches), and in another case of between about 1 square inch and about 4 square inches (or greater than about 1 square inch and/or less than about 4 square inches) to provide the desired performance as will be described in greater detail below. Each cell 14 can open at an upper/distal end thereof defining the mouths 20, and mouths 20/distal ends of the cell walls 18 can generally aligned to provide the surface 16 against which a user's body 30 can be positioned, as will be described in greater detail below. The device 10 can be configured such that the upper surface 16 of the mat 12 is at least about 50% voids/open spaces (e.g. not defined by the cell walls 18) in one case, or at least about 70% voids/open spaces in another case, or at least about 90% voids/open spaces in another case, to provide desired fluid flow as will be described in greater detail below.

With reference to FIG. 3, in the illustrated embodiment the portion of the cell wall 18 of each upper cell portion 24 has a greater thickness than the portion of the cell wall 18 of the lower cell portion 26. However if desired this configuration can be reversed such that the portion of the cell wall 18 of each lower cell portion 26 has a greater thickness than the portion of the cell wall 18 of the upper cell portion 24, or the portions of the cell wall 18 can have the same thickness.

In one case each cell wall 18 is shared with any adjacent cell 14 such that there are no gaps positioned therebetween. The cell wall 18 of each cell 14 can be formed as a unitary, seamless, one-piece structure with each adjacent cell 14 and/or with the associated base wall 22. Each cell wall 18 can be formed as a vertically extending/aligned structure, where "vertical" is defined in one case with respect to a gravitational frame of reference and when the device 10/mat 12 is arranged with the mouths 20 of the cells 14 facing upwardly, as shown in FIGS. 1-10. However it should be understood that the system 10 can be arranged in various configurations, and the cell walls 18 may not always be arranged vertically with respect to a gravitational frame of reference.

Figure 4:
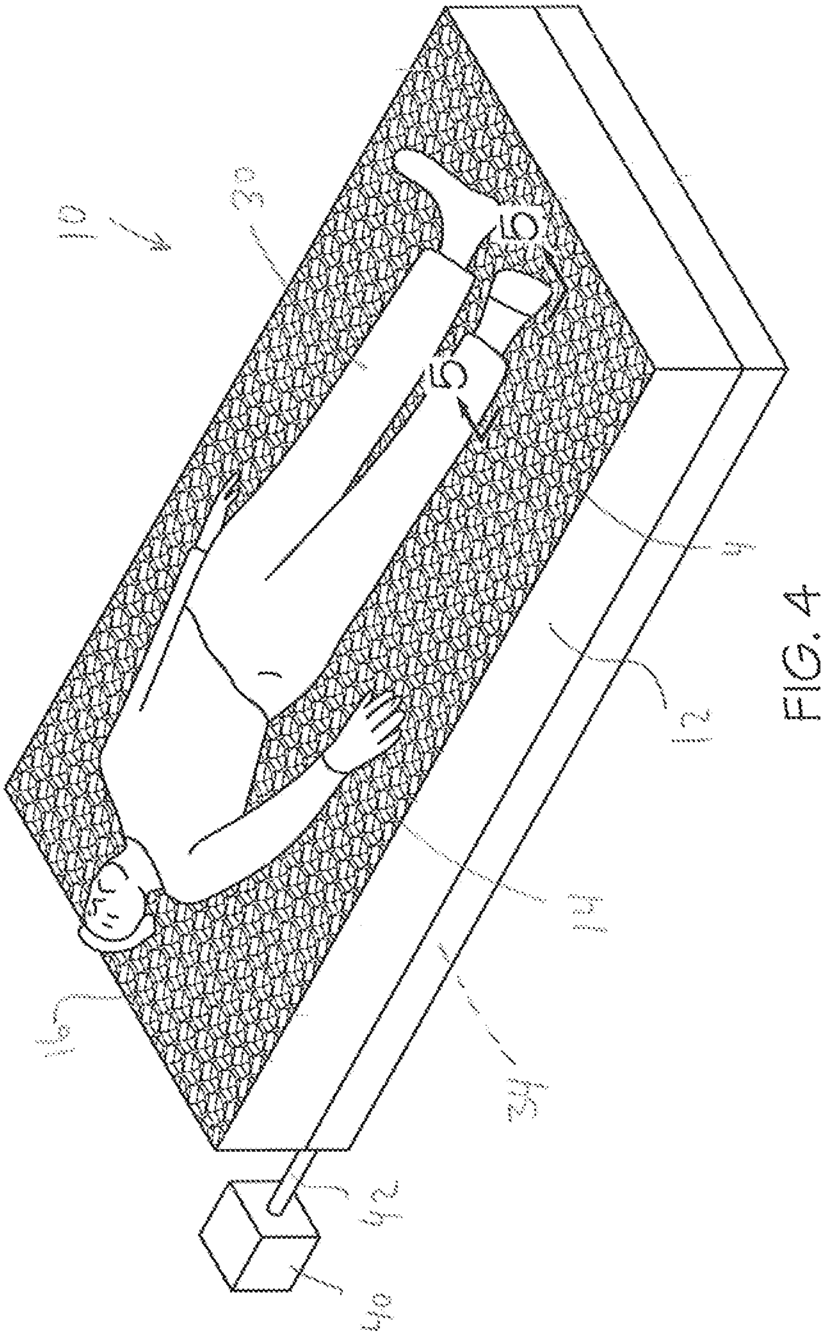
FIG. 4 is a front perspective view of the device of FIG. 1, with a user positioned thereon.
Figure 5:
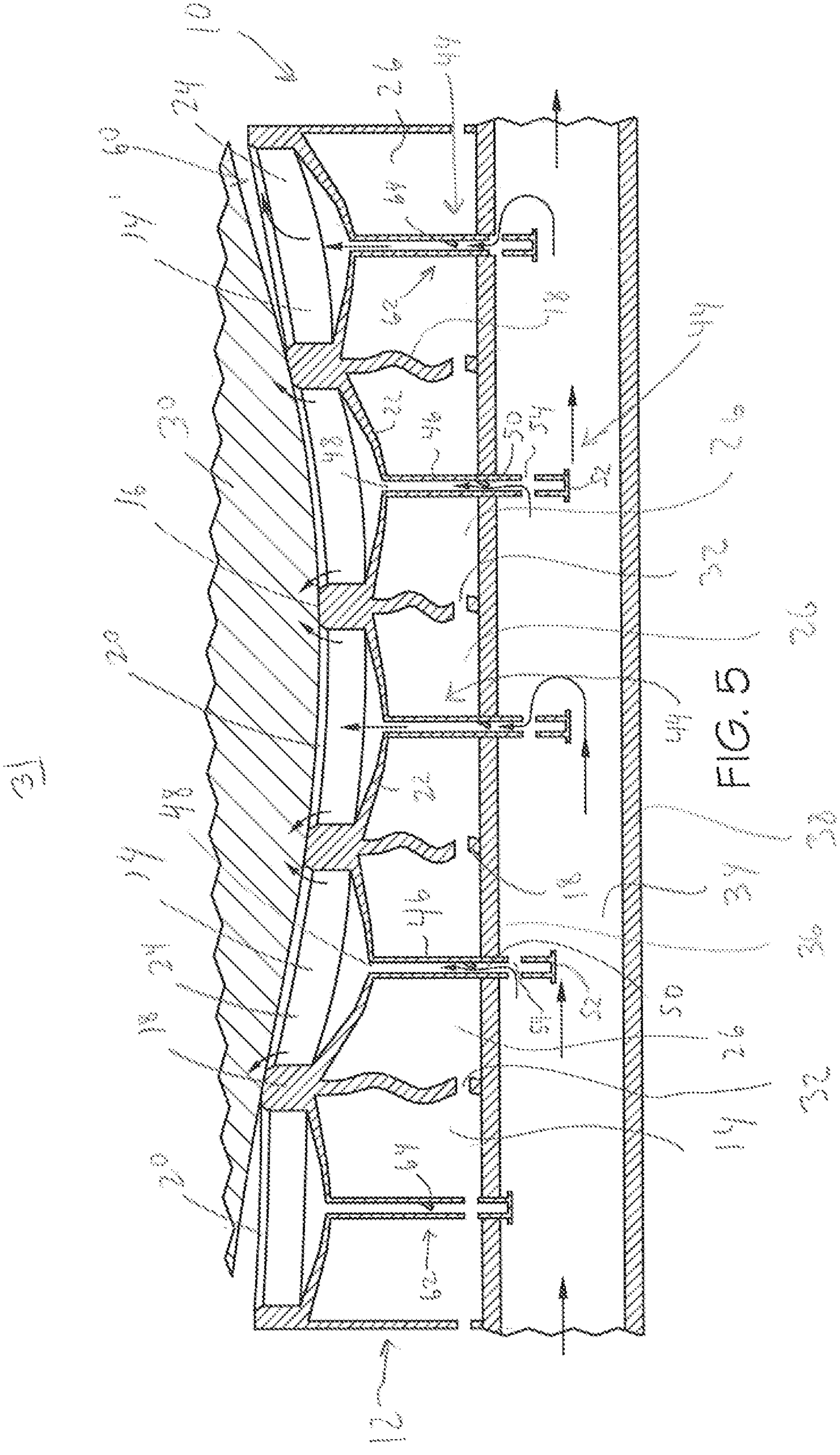
FIG. 5 is a side cross section of the device of FIG. 4, taken along line 5-5 of FIG. 4.
Figure 6:
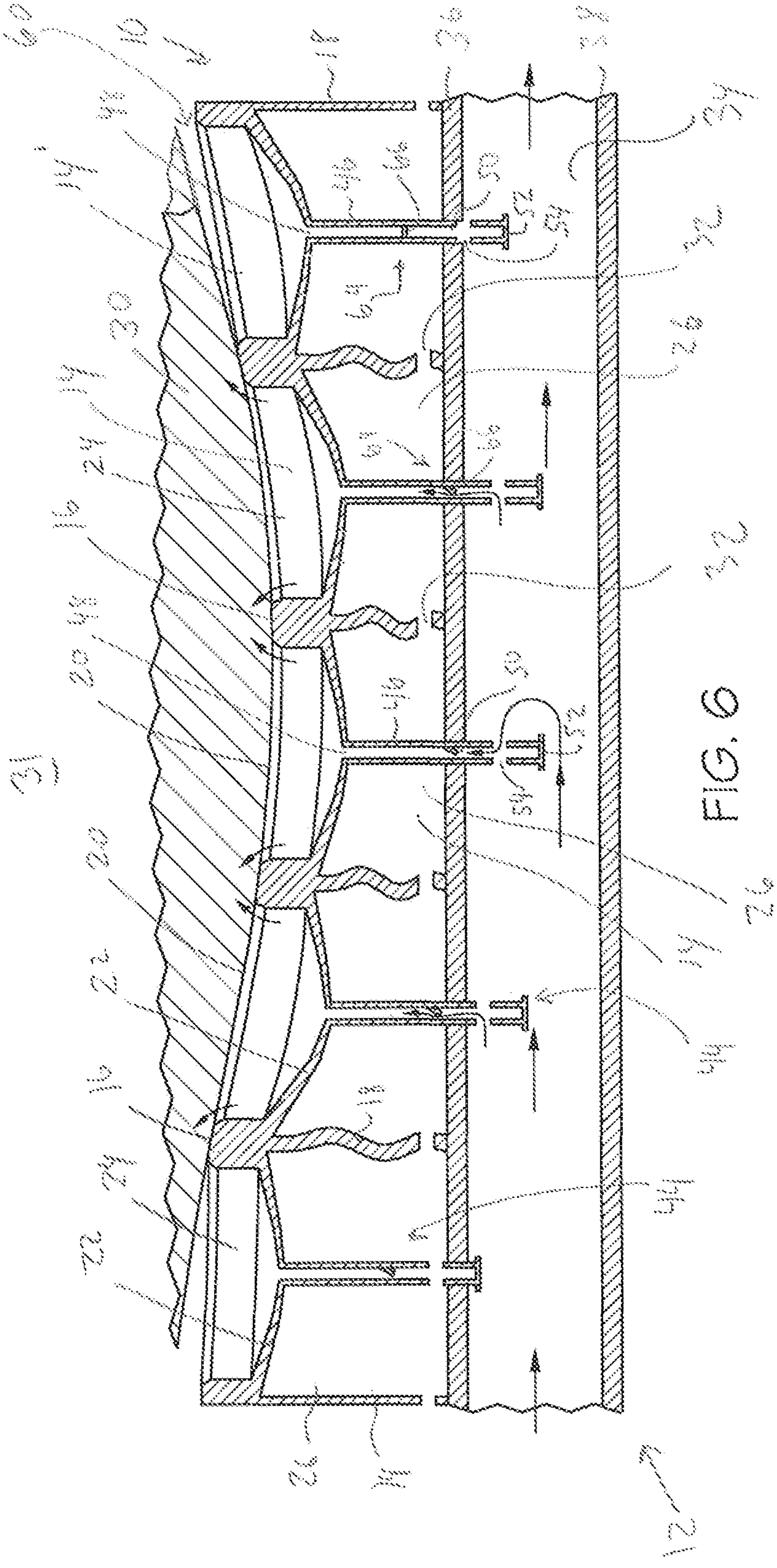
FIG. 6 is show the device of FIG. 5, with pressure reduced on an outer one of the cells.

In the illustrated embodiment of FIGS. 1-6 the upper 24 and lower 26 cell portions are fluidly isolated or generally fluidly isolated relative to each other by the base wall 22, although if desired some limited fluid communication can be provided between the upper 24 and lower 26 cell portions in certain circumstances. In addition, in one case the lower cell portions 26 can be fluidly isolated or generally fluidly isolated from each other. However in the illustrated embodiment, as shown in FIGS. 3, 5 and 6 a portion of each cell wall 18 located below the base wall 22 can have an opening 32 formed therethrough to provide limited fluid communication between adjacent lower cell portions 26. Alternatively, if desired the openings 32 can be omitted and the lower cell portions 26 can be fluidly isolated relative to each other.

The system 10 can further include a chamber 34 positioned adjacent to or below the cells 14, where the chamber 34 is in selective fluid communication with the cells 14. In particular the chamber 34 can include a first (upper) 36 and second (lower) 38 wall that (along with other walls, not shown) define the sealed or generally sealed chamber 34 therebetween. The chamber 34 can be fluidly coupled to a fluid source 40 (see FIG. 1) that can be in fluid communication with the chamber 34 to provide pressurized gas or fluid, or increase the pressure in the chamber 34, via a connection line 42 or the like such that the in one case chamber 34 is maintained at a positive/elevated pressure relative to ambient pressure. In one case the chamber 34 is maintained at a pressure of at least about 10% over the ambient atmospheric pressure, or at least about 50% over ambient atmospheric pressure in another case, or at least 100% over ambient atmospheric pressure (e.g. maintained at double the ambient pressure) in another case, and in one case is maintained at a pressure of less than about 300% over ambient atmospheric pressure, to provide the desired therapeutic benefits as will be described in greater detail below. In one case, the fluid source 40 includes or takes the form of a fan or blower that can provide air to the chamber 34. Alternatively or in addition the fluid source 40 can be, for example, a pressurized chamber or tank that stores fluid or gases therein.

The fluid provided by the fluid source and utilized by the device 10 can take any of a variety of forms, such as air, oxygen enriched air, oxygen (e.g. 90% or more oxygen by volume and/or mass), or other gases or fluids, including in some cases liquids such as water. The fluid may also be heated above or below ambient temperature and set at specific temperatures, and/or be modulated in various ways, such as temperature, air flow, or acoustics. In one case, the fluid in the chamber 34 and/or the cells 14 can be vibrated, in one case at about 47 Hz at about 4-6 dB to provide further therapeutic effects.

A valve 44 can be coupled to or included in each cell 14, where each valve 44 is configured to provide selective fluid communication between the chamber 34 and the associated cell 14/upper cell portion 24. In the embodiment shown in FIGS. 3, 5 and 6, each valve 44 includes or takes the form of a hollow stem 46 that is coupled to and/or in fluid communication with an 48 opening of the base wall 22. A lower end of each stem 46 extends through a corresponding opening 50 of the upper wall 36 of the chamber 34. Each stem 46 includes a flange 52 at the bottom end thereof to prevent the stem 46 from being pulled upwardly through the associated opening 50 of the upper wall 36 of the chamber 34. It should be noted that, although the base wall 22 and stem 46 are shown as somewhat distinction components/shapes, the base wall 22 and stem 46 can in some cases be combined into a more continuous structure, such as a funnel-shaped or generally "V" shaped component, portions of which can still be designated a base wall 22 and stem 46.

Each stem 46 can include an opening 54 formed therein. The valves 44/stems 46 can be biased to their closed position, as shown in FIG. 3, in one case due to the natural shape of the materials of the cells 14, base wall 22, valve 44 and/or stem 46 and such that the valves 44/stems 46 reside in the closed position in the absence of outside forces. In one case the valves 44/stems 46 are biased (upwardly) to the closed position with a small force to pull the flanges 52 of the valves 44 against the upper wall 36 of the chamber 34 to provide a relatively tight seal. When in the closed position, the opening 54 of the stems 46 are positioned in the cell 14 and lower cell portion 26, and are fluidly isolated from the chamber 34. In this case, the lower cell portions 26 can be in fluid communication with the upper cell portions 24 (and thereby the ambient environment 31) via the openings 54 of the stems 46. Moreover, when the valves 44/stems 46 are closed, when there is pressurized fluid is present in the chamber 33, as shown in FIG. 3, the pressurized fluid does not flow through the stems 46, valves 44 and/or the cells 14.

The cells 14, including the cell walls 18, and optionally the base walls 22 and/or stems 46, can each be made of a relatively soft/pliable material. For example, the cell walls 18, and optionally the base walls 22 and/or stems 46 can be made of a variety of materials including foams and/or rubbers of silicone, neoprene, nitrile, gum, and latex, polymers or plastics such as polycarbonate, polyurethane, polyphenylene oxide, polyethylene terephthalate glycol, poly lactic acid, acrylonitrile butadiene styrene, and polyester, composite materials, and adhesives. The materials can have a variety of stiffness, in one case having a Young's modulus ranging from about 0.001 GPa to about 4 GPa. In some cases the cells 14 and cell walls 18 are made of an airtight material, but in other cases may have some limited air permeability, such as a permeability of less than about 0.001 cm3*cm/(s*cm2*cmHg), or less than about 60 cm3*cm/(s*cm2*cmHg), or between about 0.001 cm3*cm/(s*cm2*cmHg) and about 60 cm3*cm/(s*cm2*cmHg). Each cell wall 18 can be sufficiently stiff and have sufficient structural integrity to be maintained in the configuration shown in FIG. 3, even when the chamber 34 is not pressurized. Each cell wall 18 may be fluidly isolated from the chamber 34 and any pressurized fluid, and may not be inflatable or the like.

By making the cells 14, cell walls 18, and optionally the base wall 22 and/or stem 46 of such a relatively soft/pliable material, the cells 14 can elastically deform when a user 30 lies or places sufficient body weight on the device 10/mat 12/cells 14. In particular, as shown in FIG. 4, when a user 30 lies or places sufficient weight or force on the device 10/mat 12/cell 14, each cell 14/cell wall 18 that bears sufficient weight/force can be at least partially compressed/deformed in a direction of a plane of the cell wall 18, as shown by deformed/activated cells 14 of FIG. 5. Such compression of the cells 14/cell walls 18 can cause the associated cell walls 18 and/or base walls 22 to move downwardly/inwardly, which in turn can cause the associated stem 46 to move downwardly/inwardly from the position show in FIG. 3 to the positions shown in FIG. 5. The amount of pressure/force/weight require to open a valve 44 can vary, but in once case is between about 0.1 psi (considered to be average pressure when the user 30 is resting on their back with their entire weight on the system 10/mat 12) and about 22 psi (considered to be peak pressure on ischial tuberosities while the user 30 is sitting), or greater than about 0.1 psi, or greater than about 0.05 psi, or greater than about 0.5 psi, or greater than about 1 psi, or less than about 10 psi, or less than about 22 psi. The amount of pressure/force/weight applied to a cell 14/cell wall 18 require to open the associated a valve 44 can vary, but in once case is at least about 0.1 lbs., or in another case at least about 0.25 lbs., or in another case at least about 0.5 lbs. or in another case at least about 1 lb., or in another case at least about 5 lbs., or on another case less than about 50 lbs., or in another case less than about 25 lbs., and in another case less than about 10 lbs.

This movement of the stems 46 can cause the lower/inner end of the stem 46 to protrude into the chamber 34, to a sufficient extent that the opening 54 of the stem 46 is exposed to the pressurized fluid in the chamber 34. Each valve 44 can thus be opened to allow fluid to enter the cell 14 at an opposite end of the cell 14 relative to the mouth 20/distal end. In this manner the system 10 can be configured such that each valve 44 is movable to an open position when sufficient force is applied to as associated cell 14/cell wall 18, and the force is only indirectly, and not directly, applied to the valve 44. The pressurized fluid then flows upwardly/outwardly through the exposed stem openings 54, reaching the upper cell portion 24 and then impinging upon or flowing over the user's body 30, as shown in FIG. 5

In this manner, when sufficient force or pressure is applied to a cell 14/cell wall 18, the associated valve 44 is opened and allows fluid to flow through the cell 14 and toward/over the user's body 30. The flow of fluid, such as oxygenated air, can thereby provide oxygen or other desired fluids, gases, compounds, elements, medicinal components or the like to the user's body 30 and help to reduce the occurrence of and/or healing of pressure wounds. The size, shape, and deformation of the cells 14 is configured to provide desired therapeutic benefits. In particular, it is noted that when a user 30 lies upon or applies sufficient force/pressure to a cell 14/cell wall 18 to allow fluid to flow therethrough, the user's body 30 can form at least a partial seal with the mouth 20/cell 14 since the user's body 30 can span or cover the mouth 20/cell 14. This can create a plurality of discrete pockets of positive pressure to aid in healing and/or prevention of pressure wounds. In this manner, rather than relying on one large seal to provide an area of increased pressure as in some previous systems, the current device 10 can create multiple small pockets of increased pressure.

However, it is not expected that a user's body 30 will typically form a complete seal with the mouth 20/cell 14. In particular, as shown in FIG. 5 a user's body 30 can generally span/cover the mouth 20 of the cell 14; however in most cases it is expected that the user's body 30 will not form a complete seal with the mouth 20/cell 14 due to the positioning of the body 30, the fact that a user can be wearing cloth or other air-permeable materials, etc. Thus it is possible for the mouths 20/distal ends of the cells 14 to be fluidly isolated from each other when the mouths 20/distal end of the cells 14 are sealed (e.g. when the cells 14 are pressed against bare skin, or a wearer wearing air tight materials, etc.). However it is generally desired that the user's body form an imperfect seal with the cells 14, as this will allow a limited amount of fluid to flow through the mouth 20/cell 14 to provide a continuous stream or flow of fluid (such as oxygenated air) to promote healing and/or reduce the occurrence pressure wounds. The leak values for the cells 14 may be sufficient to create a "hovercraft effect," to support the user 30 thereon on a layer of fluid/air.

The ideal leak flow rate is dependent on various factors, including the content and nature of the fluid, but in one case can at least about 0.00045 cm3/cm2/s (for 100% oxygen in one case) or in another case at least about 0.002 cm3/cm2/min. The upper limit of the flow rate can be primarily determined based upon pump capacity, noise and comfort, and in one example could be about 0.3 cm3/cm2/min. as tolerated by the user 30, or about 0.8 cm3/cm2/min if there is significant air leak and/or as desired for increased dryness (a flow rate of about 5 liters per minute may be required to maintain fullness in the system 10/mat 12 for a user 30 lying on their back). In this manner a user's body 30 may form a sufficient seal to create a pocket of increased pressure (relative to ambient/environmental pressure) in the activated cells 14, but not form a complete seal to still allow fluid to flow through such cells 14.

When a user gets off of the mat 12/system 10 or otherwise reduces the weight/force applied to the mat 12/system 10, the valves 44/cells 14 return to their original, undeformed shape and position as shown in FIG. 3, and the valves 44 are closed. The mat 12/system 10 then remains ready for use by the same or another user 30.

Thus, pressurized fluid can flow through the valves 44, with each valve 44 being movable between an open position where the valve 44 provides fluid communication between an associated cell 14 and the chamber 34, and a closed position wherein the valve 44 generally blocks fluid communication between the associated cell 14 and the chamber 34. Each cell 14 will only produce a positive pressure when it is sufficiently depressed/activated and sufficiently covered. As shown in FIG. 5, when the activated cells 14 and/or valve 44 are open, fluid exits the chamber 34, flows through the cells 14/valves 44 and generally about part of the user's body 30. Inactivated cells 14/valve 44 remain closed, and fluid does not flow through those cells 14/valves 44.

Some case, such as cell 14' of FIG. 5, the cell 14' can be open/activated, but too much fluid may be escaping from the cell 14' due to an insufficient seal with the user's body 30. For example, for the cell 14', the user's body 30 may apply sufficient force/weight to activate the cell 14', but the user's body 30 is spaced away from the cell 14' at gap 60 which may be considered to allow too much fluid to escape. Other factors, such as the user wearing relatively thick and/or air permeable clothing, can also cause excessive pressure/fluid loss. This excessive loss of fluid can be considered to effectively operate as a "leak" of fluid which does not provide a therapeutic benefit and/or can cause an undesired loss of pressure in other, activated cells 14.

Thus, if desired, in one case each cell 14/valve 44 can include a flow limiting device/shutoff mechanism 62, in the form of a stem flapper 64 in the illustrated embodiment, to limit the amount of flow through the cell 14/valve 44, and cause the valve 44 to close when too much fluid flows through the cell 14/valve 44. Each stem flapper 64 is positioned in the associated stem 46 is biased to a downwardly-angled, open position as shown in FIG. 3. When there is excessive fluid flow through the valve 44/stem 46, the fluid pressure is sufficient to cause the stem flapper 64 to pivot/move upwardly to its closed position, as shown in conjunction with cell 14' of FIG. 6, to block the flow of fluid therethrough. Other flappers 64 of open/activated cells can remain open, as shown in FIG. 6. In this manner the flow limiting devices 62 help to ensure that pressure within the system 10 is maintained at sufficiently high levels by closing/shutting off cells 14/valves 44 where fluid flow is too high and can be considered leaks in the system 10. The flow limiting devices/shutoff mechanisms 62 thereby block fluid from entering or flowing through the cell 14 when a flow of fluid into the cell 14 is too great.

Figure 7:
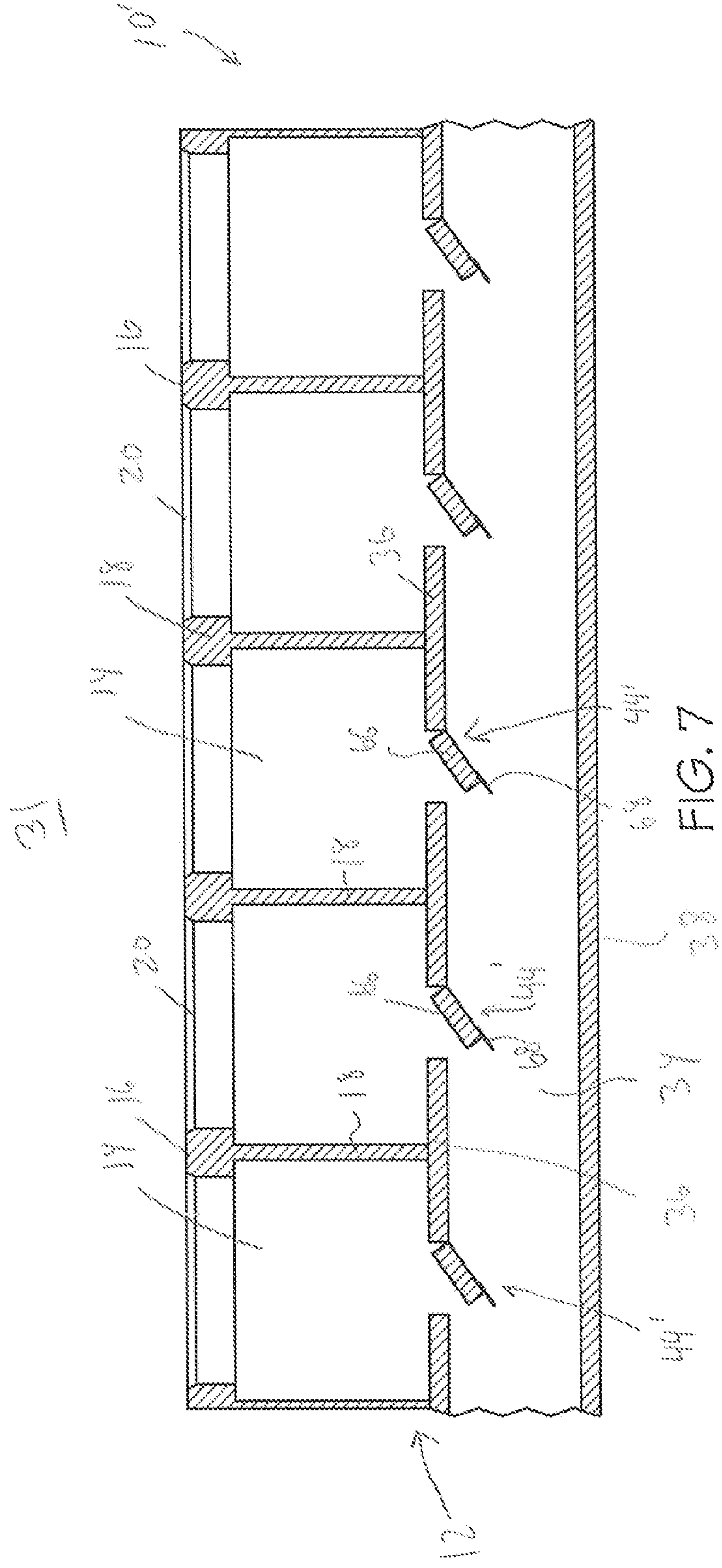
FIG. 7 is a side cross section showing a device with an alternate valve system, with the valves in an open position.
Figure 8:
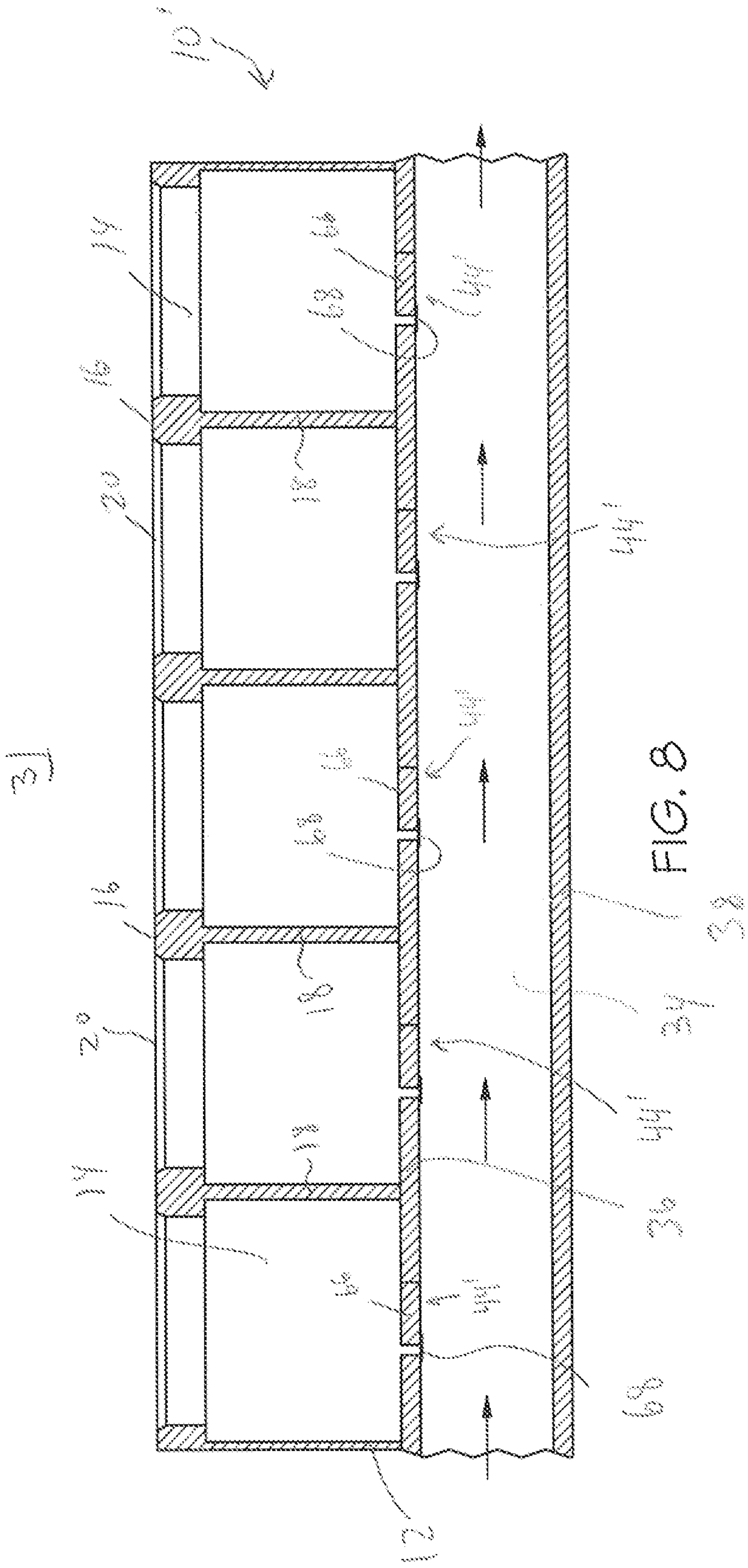
FIG. 8 shows the device of FIG. 7, with the valves in a closed position.
Figure 9:
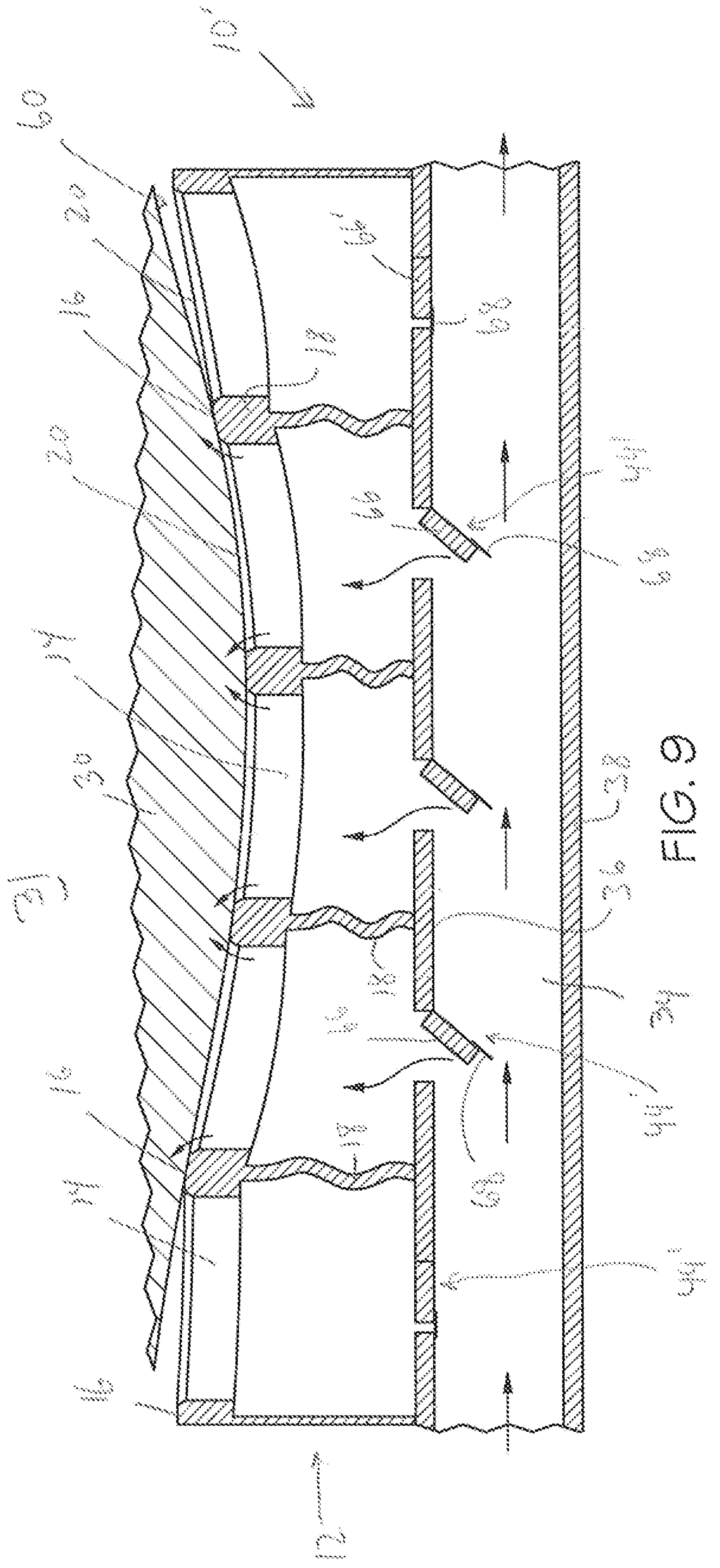
FIG. 9 show the device of FIG. 8, with a user positioned thereon and the valves in an open position.

FIG. 7-9 illustrate an alternative embodiment of the device 10'. In this embodiment each cell 14 does not include the base wall 22, and thus is not divided into upper 24 and lower 26 cell portions. In addition, each cell 14 lack the stem 46, and also lack the openings 32 formed in the cell walls 18 in the illustrated embodiment (although in some cases the openings 32 may be provided to allow some limited fluid communication between the cells 14). In addition, in the embodiment of FIGS. 7-9, the valves 44' include or take the form of flapper valves that can be formed in the upper wall 36 of the chamber 34, or formed as separate components coupled to the chamber 34. Each flapper valve 44' can include a flapper component 66 that is biased to an open, downwardly angled position as shown in FIG. 7, in the absence of any outside force, and when the chamber 34 is not pressurized.

When pressurized fluid is introduced into the chamber 34, each flapper component 66 can move to its closed position, as shown in FIG. 8, due to the increased pressure in the chamber 34. Each flapper component 66 can include a stop 68 that engages a lower side of the upper wall 36 of the chamber 34 to limit the movement of the flapper component 66 and improve the seal thereof. Thus, during use/operation of the device 10', when the chamber 34 is pressurized, each valve 44' is biased to its closed position.

When a user 30 lies upon or applies sufficient force/pressure to a cell 14, those cells 14 are compressed and the cell walls 18 deform, as shown in FIG. 9. The increased pressure in the cell 14 (e.g. due to reduced size) and/or the shape of the flapper component 66 causes the valves 44'/flapper components 66 of the activated cells 14 to move to their open positions, as shown in FIG. 9. When the flapper components 66 are open, the pressurized fluid is allowed to flow into the cells 14 from the chamber 34, and exit (usually, relatively slowly) by flowing around the user's body 30 and/or clothes. The user's body 30 thus forms a partially sealed cavity and partially traps fluid in the cell 14, and increases the pressure in the cells 14 due to fluid flowing into the cell 14 from the chamber 34 such that the pressure in the cells 14 is greater than the pressure in the chamber 34. The pressure differential maintains the activated flapper components 66 in the open position in the state shown in FIG. 9.

In this manner, again, pockets of positive pressure are applied against the user 30 to reduce the development of pressure wounds. If there is an excessive flow of fluid though cell 14 (e.g. in one case due to a user's body lifting off the mat 12 at gap 60 of FIG. 9), this causes a loss of positive pressure in the cell 14, and the valve 44'/flapper component 66' can automatically move/return to the closed position, as shown for example by flapper component 66' of FIG. 9. When a user gets off of the mat 12/system 10 or otherwise reduces the weight/force applied to the mat 12/system 10, the cells 14 return to their original, undeformed shape and position as shown in FIG. 8, and the valves 44' are closed.

The embodiment of FIGS. 2, 3, 5 and 6 illustrate the valve 44 in the form including the stem 46, and the embodiment of FIGS. 7-9 illustrate the valve 44' including the flapper component 66. However it should be understood that those embodiments, as well as other embodiments, can includes any of a wide variety of valves 44 that are configured to open and/or provide a flow of fluid into/through the associated cell 14 when sufficient force or pressure is applied thereto. Thus the valves 44 can also include or take the form of, for example, a ball-and-cage valve, a spring-biased single seat valve, leaflet valves (in one case including in one case three or four leaflets, similar to a cardiac valve), valves controlled by a deformation or bulging of the upper wall 36 of the chamber 34 such that such deformation/bulging elastically opens the valve 44, and other types of valve as may be appreciated.

Figure 10:
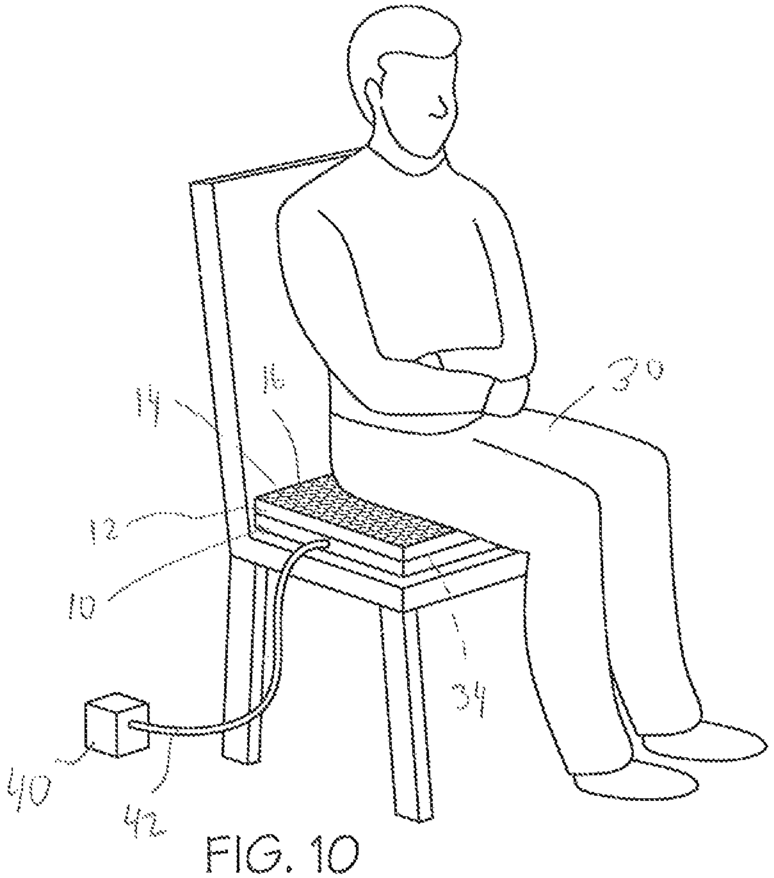
FIG. 10 is a front perspective view of another embodiment of the pressure support device, positioned on a chair.

In the embodiment of FIGS. 1 and 4, the device 10/mat 12 is shown in the form of a mattress or flat surface upon which a user can lie. However the device 10/mat 12 can take any of a wide variety of forms and be arranged in various configurations. For example, as shown in FIG. 10, the device 10/mat 12 can be arranged as a seating pad which can be sat upon by a user 30. In this case, it may be expected that each cell 14 can experience a greater weight/force than in the embodiment of FIGS. 1 and 4, and the materials of the cells 14/cell walls 18 may be adjusted to be slightly stiffer and/or the pressure/force require to open the valves 44 may be adjusted.

Figure 11:
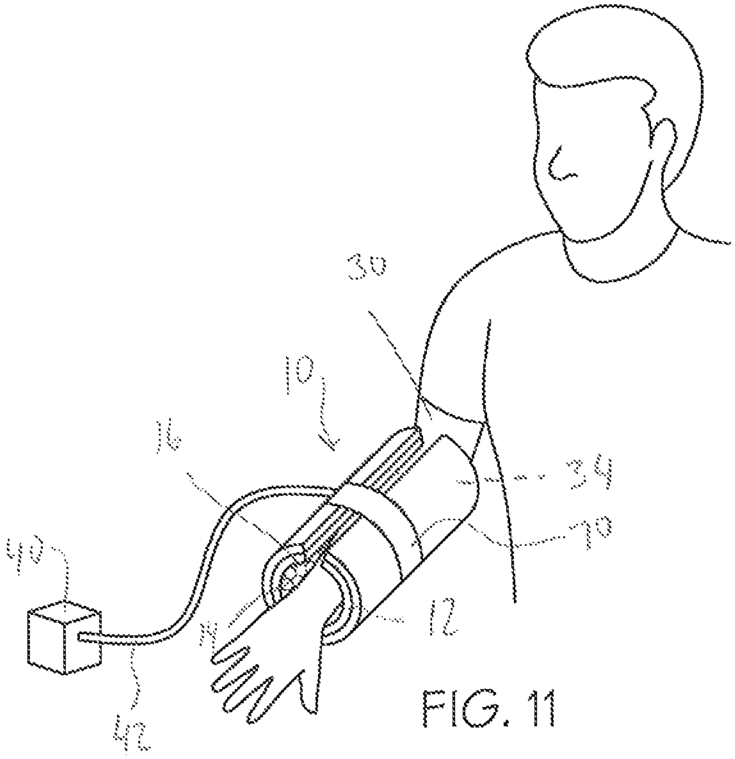
FIG. 11 is a front perspective view of another embodiment of the pressure support device, positioned about the arm of a user.

FIG. 11 shows another embodiment in which the device 10/mat 12 is wrapped around the user's arm. In this case, a compressive strap 70 or the like may be wrapped around the device 10/mat 12 to press the user's arm against the device 10/mat 12 (and vice versa) to apply the necessary compression force to the cells 14. Thus the pressure/force required to open the cells 14 need not necessarily be provided by the weight of the user 30. In an alternative embodiment the device 10/mat 12 of FIG. 11 may be biased to a certain position (e.g. a relatively tight coil), and when the user's arm is placed in the device 10/mat 12, the coil is forced partially open, and the biasing force as the coil seeks to return to its un-biased position can apply the desired force/pressure to the cells 14.

The device 10/mat 12 can also be configured to be wrapped or pressed against other portions of the user's body 30, such as legs, torso, neck, head, or other appendages. Thus, the device 10 can be configured such that when the device 10 is sufficiently pressed against the user's body 30, such as via gravitational forces applied by the user's body, or by compression or other forces, certain cells 14/valves 44 are activated to provide the pockets of positive pressure and the associated therapeutic benefits.

Having described the invention in detail and by reference to the various embodiments, it should be understood that modifications and variations thereof are possible without departing from the scope of the claims of the present application.

What is claimed is:

1. A support device comprising:

a plurality of cells, each cell having an open distal end defining a mouth in fluid communication with the ambient environment, and being at least partially defined by a cell wall;

a chamber; and a plurality of valves, each valve being spaced away from the associated mouth and movable between an open position where the valve provides fluid communication between an associated cell and the chamber, and a closed position wherein the valve generally blocks fluid communication between the associated cell and the chamber, wherein each valve is configured to be biased to a closed position during use of the device, and wherein each cell is configured such that when the cell is substantially sealed at its mouth and experiences a predetermined increase in fluid pressure while the associated valve is in the closed position, the associated valve moves to the open position due to the increased fluid pressure in the cell.

2. The device of claim 1 wherein the distal ends of the cells are generally aligned to provide a surface against which a user's body can be positioned.

3. The device of claim 1 wherein the distal end of each cell is positioned generally opposite to a location where the associated valve allows air to enter the cell when the valve is in the open position, and wherein each cell is configured such that a predetermined force applied to each cell, that is not directly applied to the associated valve, causes the increase in fluid pressure which in turn causes the valve to open.

4. The device of claim 1 wherein the chamber is configured to be maintained at a positive pressure relative to an ambient pressure such that when each valve is in the open position the distal end of each cell covered by a user's body is maintained at a positive pressure.

5. The device of claim 1 wherein the distal end of the cell defines a surface against which a user's body can be positioned and is in selective fluid communication with the chamber via the valve.

6. The device of claim 1 wherein the valve includes a flapper that is configured to be biased to the closed position when the chamber is maintained at a predetermined positive pressure relative to an ambient pressure, and wherein the flapper is configured to move to the open position when the increased fluid pressure is experienced in the associated cell.

7. The device of claim 6 wherein the flapper is configured to be biased to an open position when the chamber is not maintained at the predetermined positive pressure.

8. The device of claim 1 wherein each cell wall is made of an elastically deformable material, and wherein the device is configured such that when each cell is deformed a predetermined amount the associated valve moves to the open position.

9. The device of claim 1 wherein the device is configured that when the device is pressed against a user's body with a predetermined application force, the user's body substantially seals the mouths of at least some of the plurality of cells and causes at least a subset of the at least some of the plurality of sealed cells to move the associated valves to the open position due to increased fluid pressure in the subset of cells.

10. The device of claim 9 wherein the predetermined force is at least about 0.1 lb. applied to the cell wall of the plurality of cells.

11. The device of claim 1 wherein each cell wall is positioned against any adjacent cell walls with no gaps positioned therebetween.

12. The device of claim 1 further comprising a fluid source fluidly coupled to the chamber to maintain the chamber at a positive pressure relative to ambient pressure.

13. The device of claim 12 wherein at least a portion of the device is pressed against a user's body with a predetermined application force which causes at least some of the cells to move the associated valves to the open position, and wherein the distal end of at least some of the cells pressed against the user's body are maintained at a positive pressure relative to ambient pressure, and wherein at least about 50% of a surface area of the portion of the device pressed against the user's body is open spaces not defined by the cell walls.

14. A support device comprising:

a chamber configured to be maintained at a positive pressure; and a plurality of cells, wherein each cell is open at a distal end to define an associated mouth that is fluid communication with the ambient environment, wherein each cell is in selective fluid communication with the chamber, and wherein the device is configured such that when in use and when a user's body is sufficiently pressed against a cell, the cell is activated by fluid pressure inside the cell to allow fluid to move from the chamber into the associated cell, and when the user's body is not sufficiently pressed against the cell, the cell is deactivated and does not allow fluid to move from the chamber to the associated cell.

15. The device of claim 14 wherein each cell includes an associated valve, wherein each valve is movable between an open position where the valve provides fluid communication between the associated cell and the chamber, and a closed position wherein the valve generally blocks fluid communication between the associated cell and the chamber, wherein each valve is configured to be biased to a closed position during use of the device, and wherein the device is configured that when a predetermined force is applied to each cell the associated valve moves to the open position.

16. The device of claim 15 wherein each cell is at least partially defined by a cell wall, wherein the distal ends are generally aligned to provide a surface against which a user's body can be positioned, wherein at least about 50% of a surface area of the surface is open spaces not defined by the cell walls, wherein each cell wall is made of an elastically deformable, airtight material, and wherein the device is configured such that when each cell is substantially sealed at its mouth and a predetermined force is applied to the cell while the associated valve is in the closed position, the associated valve moves to the open position due to increased fluid pressure in the cell.

17. A method comprising:

accessing a device including plurality of cells each including a valve and having an open distal end defining a mouth in fluid communication with the ambient environment, the device further having a chamber maintained at a positive pressure, wherein each valve is in a closed position such that the valve generally blocks fluid communication between the chamber and the associated cell; and allowing or causing a user's body to be pressed against the device such that at least some of the valves associated with cells that are pressed against the user's body are moved to an open position due to increased fluid pressure in the cell such that the opened valves provide fluid communication between an associated cell and the chamber such that fluid can flow from the chamber into the associated cell.

18. The method of claim 17 wherein the mouths of at least some of the cells having open valves form an at least partially sealed cavity with the user's body, wherein the at least partially sealed cavities are maintained at a positive pressure relative to an ambient pressure.

19. The device of claim 1 wherein each valve is biased to an open position when the device is not in use, and wherein the chamber underlies the plurality of cells such that each cell is positioned between the chamber and the ambient environment.

20. The device of claim 19 wherein each valve is configured to automatically move to a closed open position during use of the device and when a pressure in the chamber reaches a predetermined level.

21. The device of claim 1 wherein each cell wall is made of an airtight material.

22. The device of claim 1 wherein each cell is entirely open at its mouth and lacks any structure at a center portion of the distal end thereof.

23. The device of claim 1 each cell is configured such that when the cell is substantially sealed at its mouth and a predetermined force is applied to the cell while the associated valve is in the closed position, the associated valve moves to the open position solely due to increased fluid pressure in the cell.

* * * * *